J. W. HUBBLE.
TIRE CHAIN FASTENER.
APPLICATION FILED NOV. 17, 1919.

1,418,149.

Patented May 30, 1922.
2 SHEETS—SHEET 1.

INVENTOR
Joel W. Hubble
BY Chas. H. LaPoale
ATT'Y.

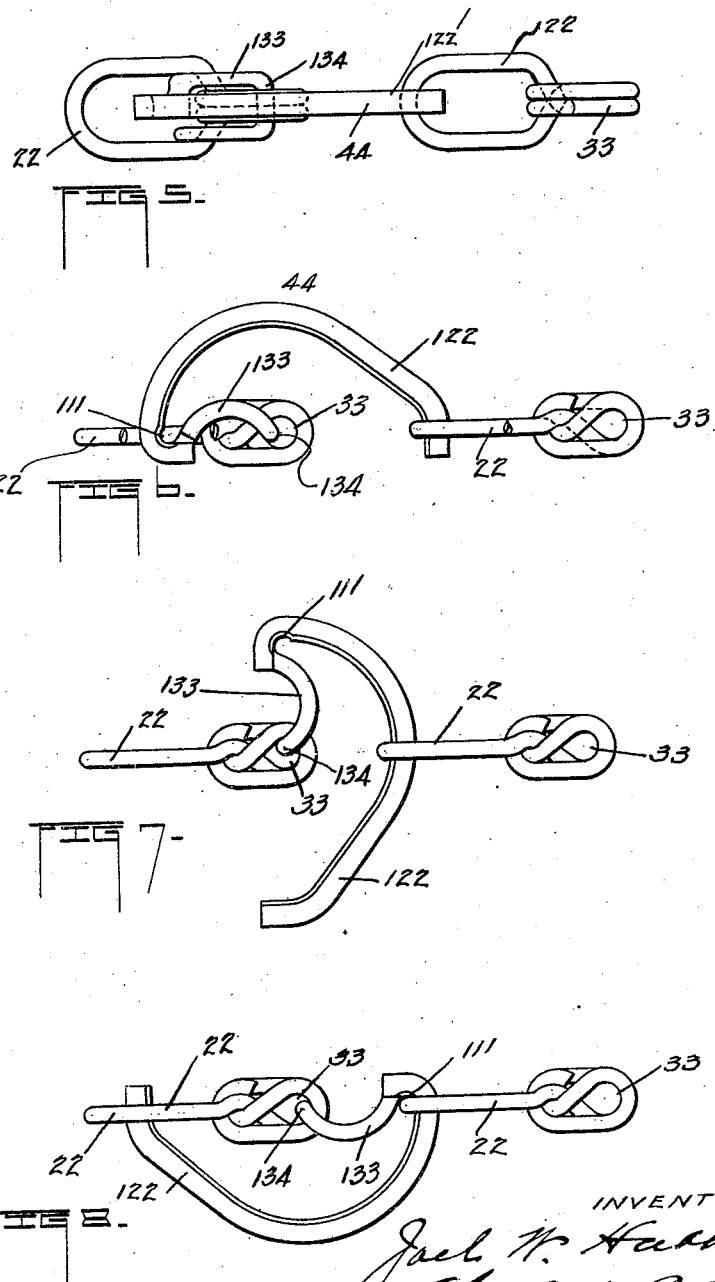

UNITED STATES PATENT OFFICE.

JOEL W. HUBBLE, OF JACKSONVILLE, ILLINOIS.

TIRE-CHAIN FASTENER.

1,418,149.  Specification of Letters Patent.  Patented May 30, 1922.

Application filed November 17, 1919. Serial No. 338,514.

*To all whom it may concern:*

Be it known that I, JOEL W. HUBBLE, a citizen of the United States, a resident of Jacksonville, in the county of Morgan and State of Illinois, have invented new and useful Improvements in Tire-Chain Fasteners, of which the following is a specification.

This invention has reference to a new and improved fastener for securing the ends of chains, and which is particularly well adapted to secure the ends of tire chains, when applied to automobile tires.

The principal object of this invention is to provide a fastener for tire chains that is self contained, and does not require the use of additional guards or clasps to hold same in proper relation to the tire chain after being adjusted, thereby eliminating the necessity of the usual tool for attaching and detaching fasteners of this description.

A further object of this invention is a fastener for tire chains having as one of its functions to draw up and tighten the tire chain after the ends are connected thereto, thereby reducing the tendency for the tire chain to whip itself loose from the tire when in use.

That the invention may be more fully understood, reference is had to the following drawings, in which—

Figures 5, 6, 7 and 8 are views similar in all respects to Figures 1, 2, 3 and 4, respectively, but showing a modified form of fastener made necessary because of the peculiar difference in the chains.

Like characters of reference denote corresponding parts throughout the figures.

In Figures 1 to 4, both inclusive, a well known form of tire chain is illustrated which is capable, as will become evident, of being attached to the fastener illustrated in said figures, and also to the fastener shown in Figures 5 to 8, both inclusive. This is because the chain shown in Figures 1 to 4 is formed of links, one end of which may be spread apart so as to receive the body of the fastener shown in Figures 1 to 4, but the links of the chains in Figures 5 to 8 are made of a peculiar formation at one end, i. e., intertwisted so as to form an eye; and therefore may not be spread apart so as to receive the body of the fastener shown in Figures 1 to 4, therebetween.

Figure 1:
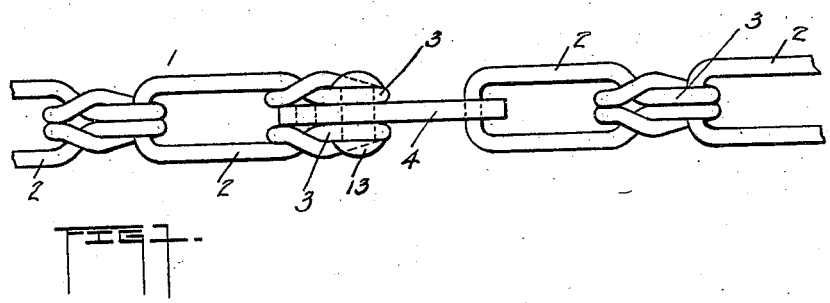
Figure 1 is a plan view of a fastener embodying my invention.

Referring to Figures 1 to 4, 1 designates a chain made up of a plurality of links 2, one end of each link formed with eyes 3 which lie in juxtaposition and which may be separated so that the end of the link which is permanently secured to the fastener may be spread apart so as to receive the body of the fastener therebetween, as shown in Figure 1.

4 designates the fastener, comprising an elongated body having a straight edge 5 and a curved edge 6, and 7 is a rivet or bolt hole in the body of the fastener which is located eccentrically to the ends of the fastener and near the straight edge 5. The body of said fastener is also provided with a cam shaped slot 8, terminating at one end 9, in the body of the fastener and opening out of the fastener at 10 in the straight edge 5, near the opposite end of said fastener. This slot 8 beginning at its terminal 9 is struck on a radius from the center of the rivet or bolt hole 7, continuing thus for approximately one-quarter of a circle, and then follows the edge 6, producing a cam shaped slot, and where it opens out of the fastener is straight for a short distance, extending preferably at right angles to the edge 5 to facilitate in an easy attachment of the free end of the chain to the fastener. The terminal 9 of the slot 8 has a seat 11 to receive the link at the free end of the chain when the fastening has been completed. The cam shaped slot 8 in the fastener body results in producing a sinuous shaped elongated hook portion 12 which receives the link at the free end of the chain and by means of which the free end of the chain is secured to the fastener 4.

To secure one end of a chain permanently to the fastener 4, the eyes 3 of the end link are separated, as shown in Figure 1, so as to receive the body of the fastener therebetween, and with the rivet or bolt hole positioned coincidently with the eyes 3, permitting a rivet pin or bolt 13 to be passed through the eyes 3 and the hole 7 in the fastener, thus securing one end of the chain to the fastener and yet permitting the fastener to be turned in its length during the operation of connecting the free end of the chain to the fastener and taking up the slack in the chain.

Figure 2:
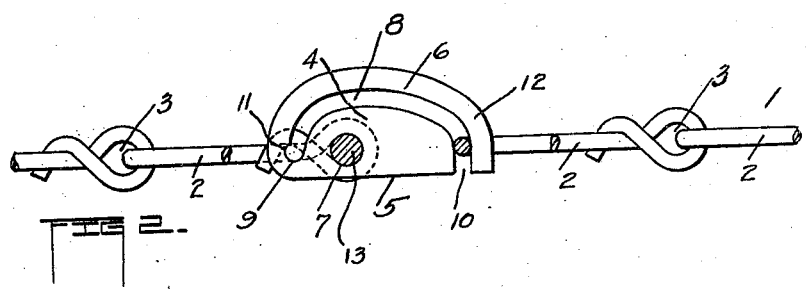
Figure 2 is an elevation of Figure 1, illustrating the first step when connecting the loose end of the chain to the fastener.
Figure 3:
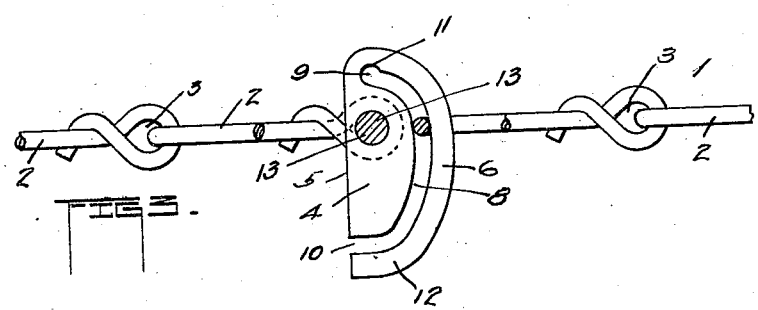
Figure 3 is an elevation similar to Figure 2, except that the process of tightening the chain by means of the fastener, is shown about half completed.
Figure 4:
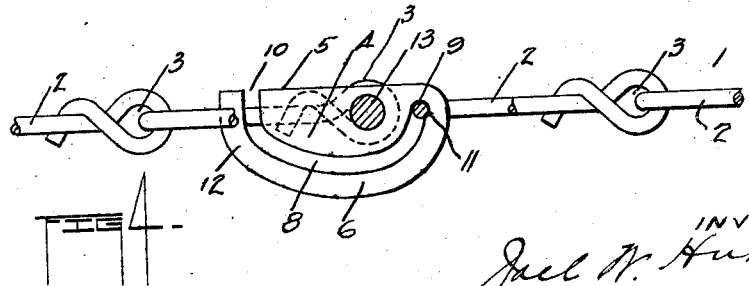
Figure 4 is an elevation showing the fastener as it appears after the process of tightening the chain has been completed.

In operation, with the fastener in the position shown in Figure 2, the operator drawing the chain will slip the link at the free end of the chain over the end of the hook 12, the end of the link moving in the slot 8. In this position the fastener is now ready to be reversed end for end to draw up and tighten the chain. This is accomplished by clasping the fastener with the fingers and rotating the same as shown in Figure 3, the rivet pin or bolt 13 serving as the fulcrum point on which the fastener is turned. By reference to Figure 3, it will be obvious that as the fastener is rotated from the position shown in Figure 2 to the position shown in Figure 4, that the link at the free end of the chain moves through the slot 8 and along the hook 12, gradually decreasing its distance from the rivet pin 13 until it seats itself in the seat 11 at the terminal 9 of said slot, when the parts will have assumed the position shown in Figure 4 with the open slot end of the fastener lying within the link fastened by the rivet pin 13 to the fastener. The shortening of the distance between the link at the free end of the chain and the rivet pin, due to the shape of the slot 8 and the rotation of the fastener, will take up the slack and tighten the chain. The amount of take up will vary with the length of the fastener and the eccentric position of the rivet pin relatively to the ends of the fastener, as will be understood.

The difference between the fastener shown in Figures 5 to 8 and that shown in Figures 1 to 4, resides in the structural changes to accommodate the change in design of the links of the chain. In Figures 5 to 8, the links 22 are formed with eyes 33, the bodies of which are intertwisted with the bodies of the links and may not be separated, as the eyes 3.

The fastener 44 in general design conforms to the fastener 4, except that it has no pronounced cam like slot such as shown in Figures 1 to 4, but it does have the elongated sinuous shaped hook 122, shaped somewhat like the hook 12 which receives the link 22 at the free end of the chain during the operation of attaching the chain. A seat 111 receives the link at the free end of the chain when the fastening operation is completed. Instead of securing a link 22 to the fastener by a rivet pin or bolt, the fastener is formed with an eye 133, the cross-bar 134 of which receives the eyes 33 of the link and serves as the fulcrum point on which the fastener is rotated, which said cross-bar is disposed eccentrically with respect to the opposite ends of the fastener, and occupies the same position in the fastener 44 that the rivet pin or bolt occupies in the fasteners 4.

It is not deemed necessary to describe in detail the steps followed when fastening the two ends of the chain, as the drawings make this quite plain and the process is not unlike that described in connection with Figures 1 to 4. The modified construction merely illustrates the scope of the invention and I, therefore, do not wish to be confined to details except as expressed in the appended claim.

What I claim is:

In a tire chain fastener, in combination, an elongated body having one straight edge, a fastener opening to receive a connecting element for one end of a chain, said opening located eccentrically to the ends of the body, and a cam shaped slot in said body, said slot opening out of said straight edge and terminating in the body at a point in proximity to said fastener opening.

In witness whereof, I have hereunto affixed my hand this 6th day of November 1919.

JOEL W. HUBBLE.